(12) United States Patent
Oguchi et al.

(10) Patent No.: US 7,634,356 B2
(45) Date of Patent: Dec. 15, 2009

(54) NAVIGATION DEVICE

(75) Inventors: Junko Oguchi, Yamato (JP); Akiko Arakawa, Kamakura (JP); Akinori Uchida, Fujisawa (JP)

(73) Assignee: Xanavi Informatics Corporation, Kanagawa-ken (JP)

( * ) Notice: Subject to any disclaimer, the term of this patent is extended or adjusted under 35 U.S.C. 154(b) by 342 days.

(21) Appl. No.: 11/514,219

(22) Filed: Sep. 1, 2006

(65) Prior Publication Data
US 2008/0082253 A1 Apr. 3, 2008

(30) Foreign Application Priority Data
Sep. 2, 2005 (JP) ............................. 2005-254508

(51) Int. Cl.
*G01C 21/30* (2006.01)
(52) U.S. Cl. ................... 701/210; 701/213; 340/995.15
(58) Field of Classification Search ......... 701/207–215; 340/995.13, 995.19, 995.16, 990
See application file for complete search history.

(56) References Cited
U.S. PATENT DOCUMENTS

| | | | |
|---|---|---|---|
| 6,812,888 B2 * | 11/2004 | Drury et al. ............ | 342/357.13 |
| 6,865,480 B2 * | 3/2005 | Wong ........................ | 701/210 |
| 7,161,504 B2 * | 1/2007 | Linn ..................... | 340/995.13 |
| 7,395,149 B2 * | 7/2008 | Matsumoto et al. ......... | 701/207 |

FOREIGN PATENT DOCUMENTS

JP 2003-035546 2/2003

* cited by examiner

*Primary Examiner*—Richard M. Camby
(74) *Attorney, Agent, or Firm*—Antonelli, Terry, Stout & Kraus, LLP.

(57) ABSTRACT

When there is an area (chargeable area) that may be avoided, a suitable bypass route is presented with suitable timing. When a retrieved recommended route passes through an area (for example, a chargeable area) that may be avoided, a navigation device searches in advance for a bypass route that starts from a branch point (such as an intersection) on the recommended route before the area and bypasses the area without taking a long way around the area. The navigation device presents the recommended route before the area is approached, and presents the bypass route for the first time when the branch point becomes near.

15 Claims, 10 Drawing Sheets

MAP DATA 310

CHARGEABLE AREA DATA 330

| CHARGEABLE AREA ID 331 | CHARGEABLE AREA SPECIFYING INFORMATION 332 | CHARGE CONTENT 333 |
|---|---|---|
| *** | *** | *** |
| *** | *** | *** |
| ⋮ | ⋮ | ⋮ |

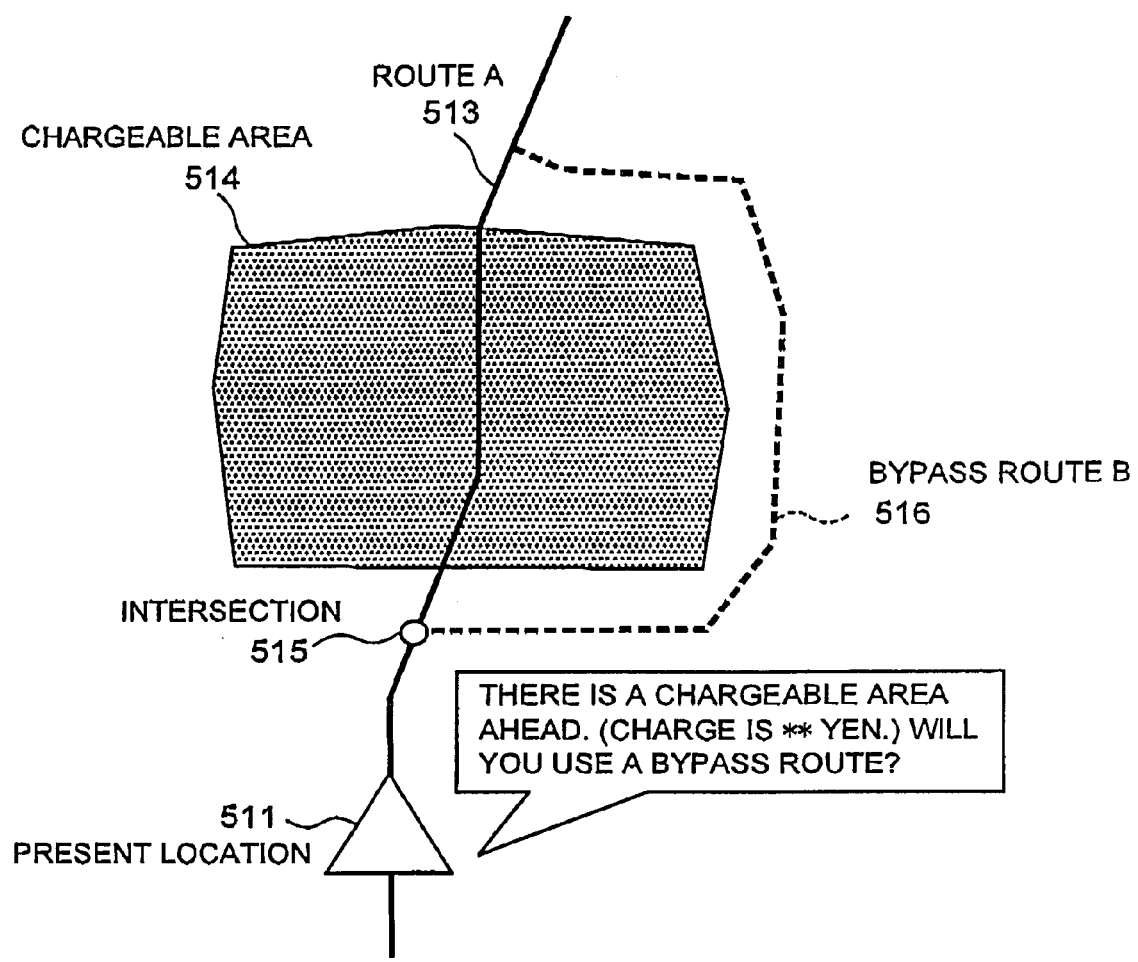

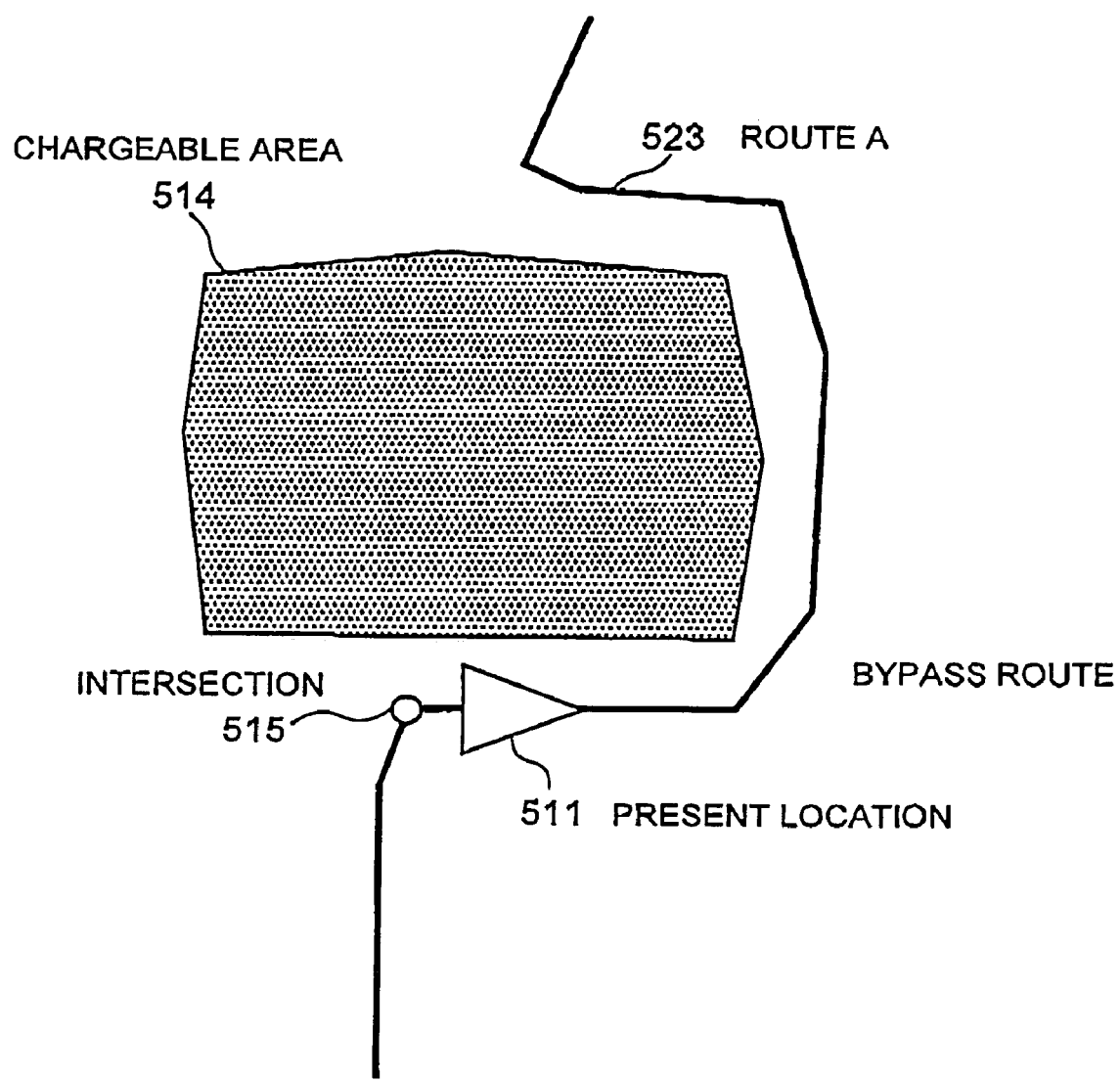

NAVIGATION DEVICE

BACKGROUND OF THE INVENTION

The present invention relates to a navigation device, and particularly to a route search technique for a car-mounted navigation device.

For the purpose of relieving traffic jams or the like, a system exists in which vehicles running in some area (chargeable area) are charged. In this regard, Patent Document 1 describes a technique of trying to search for a route that bypasses a chargeable area when a present location is within a predetermined distance from the chargeable area.

Patent Document 1: Japanese Non-examined Patent Laid-Open No. 2003-35546

However, in some cases, a suitable bypass route cannot be found if the bypass route is searched for after a vehicle approaches a chargeable area. For example, there is a case where no intersection exists up to the chargeable area so that a bypass route can not be found, or a case where a very long bypass route is retrieved. On the other hand, even if a bypass route that does not pass a chargeable area is retrieved before departure and the retrieved bypass route is used for guidance, it does not always satisfy the needs of a user. Sometimes a user wants to determine whether he will take the bypass route, not at the time of departure but at the time when a chargeable area is approached. For example, when a car approaches a chargeable area, a user may take the bypass route if he still has time. However, he may consider that there is no other choice but to pay the charge, if he does not have enough time. The technique of Patent Document 1 cannot satisfy such needs of a user.

An object of the present invention is to provide a technique of presenting a suitable bypass route with appropriate timing when there is an area that will be probably avoided.

SUMMARY OF THE INVENTION

To solve the above problem, when a retrieved recommended route passes through an area (for example, a chargeable area) that may be avoided, a navigation device according to the present invention searches in advance for a bypass route that starts from a branch point (such as an intersection) on the recommended route before the area and bypasses the area without taking a long way around the area. The navigation device presents the recommended route when the branch point is not near yet, and presents the bypass route only when the branch point becomes near.

For example, a navigation device according to the present invention comprises: a means, which stores information on an area to be avoided; a means, which searches for a recommended route to a destination without regard to whether the recommended route passes through the area to be avoided; a means, which searches for a bypass route that avoids entering into the area to be avoided but does not take a long way around the area to be avoided, when the recommended route passes through the area to be avoided; and a means, which outputs a message announcing existence of the area to be avoided, before passing a branch point to the bypass route.

Further, a navigation device according to the present invention may comprise: a means, which detects a present location; a means, which obtains information on an area to be avoided; a means, which sets a departure point and a destination; a route search means, which searches for a route A from the departure point to the destination; a bypass route search means, which searches for a route B that starts from a branch point on the route A on a near side of the area to be avoided and bypasses the area to be avoided, when the route A passes through the area to be avoided; and a guidance means, which displays the route B or the fact that the area to be avoided exists, when the present location moves to a predetermined distance before the branch point.

Further, the above-mentioned guidance means may: give guidance using the route A, until the present location moves to a predetermined distance before the branch point; display the fact that the area to be avoided exists, when the present location moves to the predetermined distance before the branch point; give guidance using the route A when the present location is on the route A even after passing the branch point; and give guidance using the route B when the present location is on the route B after passing the branch point.

Further, the above-mentioned guidance means may: give guidance using the route A, until the present location moves to a predetermined distance before the branch point; receive an instruction on whether the route B should be used for guidance, when the present location moves to a the predetermined distance before the branch point. give guidance using the route B when the instruction to use the route B for guidance is received; and give guidance continuously using the route A when the instruction to use the route B for guidance is not received.

BRIEF DESCRIPTION OF THE DRAWINGS

FIG. 10 is a screen display example; and

FIG. 11 is a screen display example.

DETAILED DESCRIPTION

Figure 1:
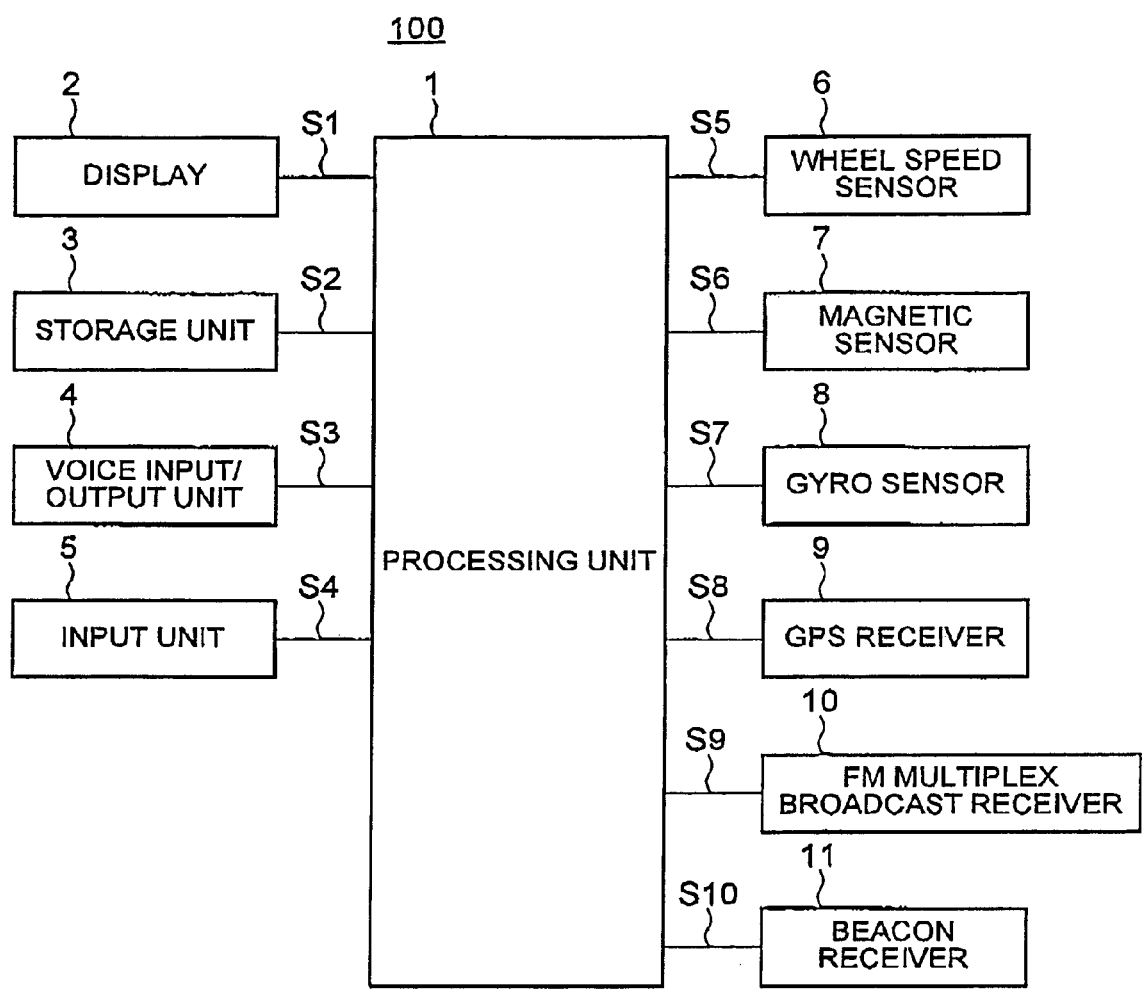
FIG. 1 is a schematic block diagram showing a car-mounted navigation device to which an embodiment of the present invention is applied.

One embodiment of the present invention will be described below, referring to the drawings.

FIG. 1 is a schematic block diagram showing a car-mounted navigation device 100 to which one embodiment of the present invention is applied. As shown in the figure, the car-mounted navigation device 100 comprises a processing unit 1, a display 2, a storage unit 3, a voice input/output unit 4, an input unit 5, a wheel speed sensor 6, a magnetic sensor 7, a gyro sensor 8, a Global Positioning System (GPS) receiver 9, an FM multiplex broadcast receiver 10, and a beacon receiver 11.

The processing unit 1 is a central unit that performs various kinds of processing. For example, the processing unit 1 detects present location based on pieces of information outputted from various sensors 6 to 8 and the GPS receiver 9. Further, the processing unit 1 reads map data required for display from the storage unit 3 based on the obtained present location information. Further, the processing unit 1 expands the read map data into a graphic, superimposes a mark indicating the present location upon the graphic, and displays the resultant graphic on the display 2. Furthermore, using map data stored in the storage unit 3, the processing unit 1 searches for the best route (recommended route) connecting the destination designated by a user and the departure point (present location). Further, the processing unit 1 guides the user through the voice input/output unit 4 and the display 2.

The display 2 is a unit that displays graphics information generated by the processing unit 1. The display 2 comprises a CRT or a liquid crystal display.

The storage unit 3 comprises a storage medium such as a CD-ROM, a DVD-ROM, an HDD or an IC card. This storage medium stores the map data 310 and chargeable area data 330.

Figures 2, 3:
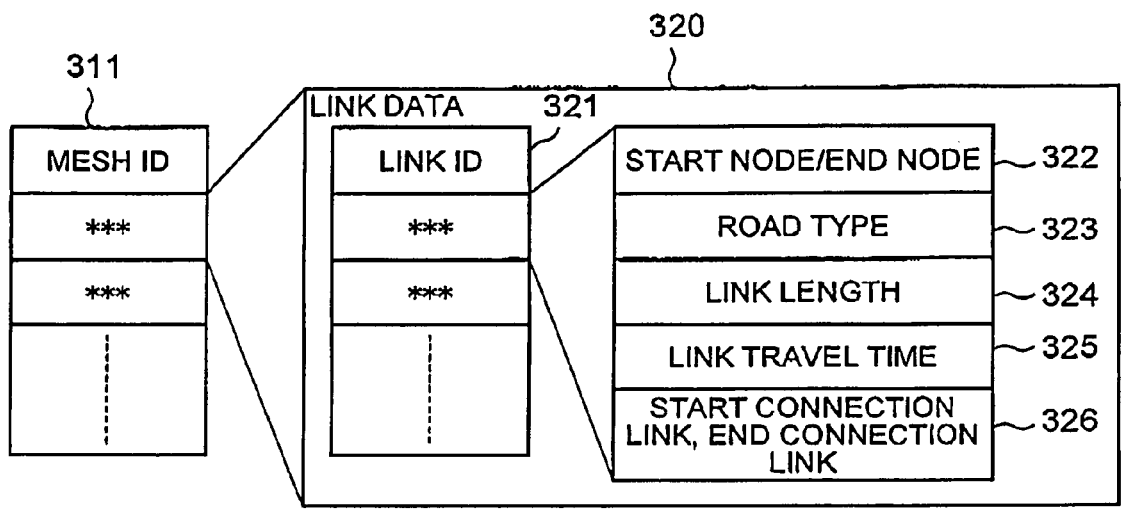
FIG. 2 is a diagram showing a configuration example of map data stored in a storage unit 3.
FIG. 3 is a diagram showing a configuration example of of chargeable area data stored in the storage unit 3.

FIG. 2 is a diagram showing a configuration of the map data 310. For each identification code (mesh ID) 311 of a mesh area (which is a demarcated area of a map), the map data 310 includes respective pieces of link data 320 of links constituting roads included in that mesh area.

For each link ID 321, the link data 320 include: coordinate information 322 of two nodes (a start node and an end node) constituting the link; type information 323 of a road that includes the link; link length information 324 that indicates the length of the link; link travel time 325; link IDs (i.e. connecting link IDs) 326 of links that are respectively connected to the two nodes; and the like. Here, two nodes constituting a link are differentiated as a start node and an end node so that the up direction and the down direction of the same road are managed as links that are different from each other. Further, a link travel time 325 may be one associated with each condition such as date and time, weather, or the like.

Furthermore, the map data 310 includes location information of intersections and a node ID of a node corresponding to each intersection. Further, information is included indicating intersections that are classified as a "main intersections".

FIG. 3 is a diagram showing a configuration of chargeable area data 330. Each piece of the chargeable area data 330 includes: an identification code (chargeable area ID) 331 of a chargeable area concerned; information (chargeable area specifying information 332) for specifying the chargeable area; and charge content 333. The chargeable area specifying information 332 stores coordinates of the location of the chargeable area on the map. Whether a certain link is a link within a chargeable area, is known from the coordinates of the nodes of that link and the chargeable area specifying information 332. The charge content 333 is content relating to the charge, such as "** yen per one entry".

Returning to FIG. 1, the description will be continued. The voice input/output unit 4 converts a message to the user (which has been generated by the processing unit 1) into a voice signal and outputs the voice signal. Further, the voice input/output unit 4 recognizes the voice of the user and transfers the voice content to the processing unit 1.

The input unit 5 is a unit for receiving an instruction from the user. The input unit 5 comprises hard switches such as scroll keys and a scale key, a joystick, a touch panel stuck on a display panel, and the like.

The sensors 6 to 8 and the GPS receiver 9 are used in the car-mounted navigation device 100 for detecting the present location (i.e. the location of the vehicle that is equipped with the navigation device in question). The wheel speed sensor 6 measures a distance based on the product of the circumference of the wheel and the measured number of revolutions of the wheel, and also measures turning angle of the moving body based on a difference between the numbers of revolutions of a pair of wheels. The magnetic sensor 7 detects the magnetic field of the earth to detect the direction in which the moving body faces. The gyro 8 comprises fiber optic gyros, vibrating structure gyros and the like, and detects an angle of rotation of the moving body. The GPS receiver 9 receives signals from GPS satellites, and measures distances and rates of change of distance between the moving body and three or more GPS satellites to detect the present location, the rate of progress, and the traveling direction of the moving body.

The FM multiplex broadcast receiver 10 receives summarized present traffic information, traffic restriction information, service area/parking area (SA/PA) information, parking lot information, and weather information sent as FM multiplex broadcast signals from FM multiplex broadcasting stations.

The beacon receiver 11 receives present traffic data, traffic restriction information, SA/PA information, parking log information, and the like, sent from beacons.

Figure 4:
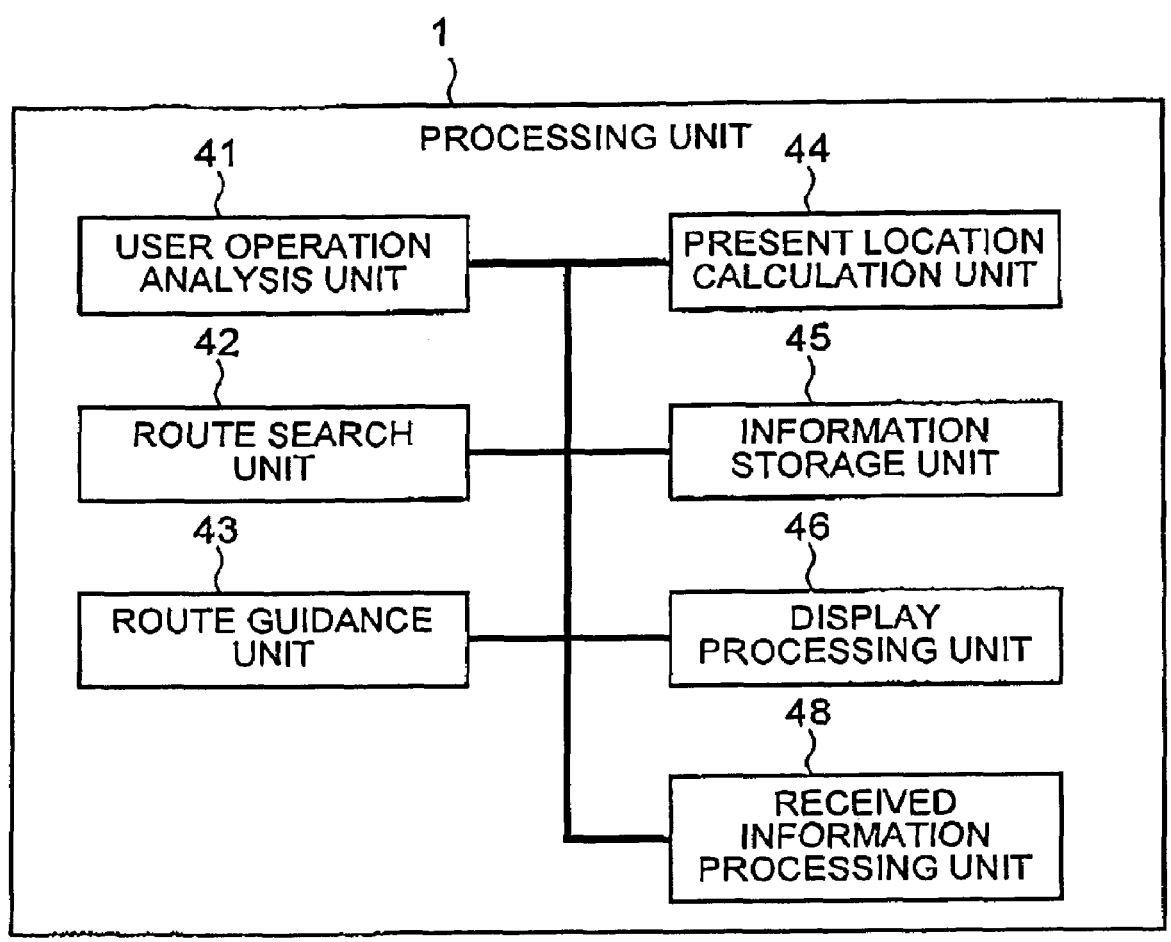
FIG. 4 is a diagram showing a functional configuration of a processing unit 1.

FIG. 4 is a functional block diagram showing the processing unit 1.

As shown in the figure, the processing unit 1 comprises: a user operation analysis unit 41; a route search unit 42; a route guidance unit 43; a present location calculation unit 44; an information storage unit 45; a display processing unit 46; and a received information processing unit 48.

The user operation analysis unit 41 receives a request inputted by the user through the input unit 5, analyzes the content of the request, and controls various component units of the processing unit 1 to perform processing corresponding to the content of the request. For example, when the user requests a search for a recommended route, the user operation analysis unit 41 requests the display processing unit 46 to display a map on the display 2 for setting a destination. Further, the user operation analysis unit 41 requests the route search unit 42 to calculate a route from the present location (the departure point) to the destination.

The present location calculation unit 44 periodically calculates the present location (X', Y'), i.e. the location of the vehicle traveling from the initial location (X, Y), by integrating distance data and angle data progressively along the time axis. Here, the distance data and the angle data are obtained by integrating distance pulse data S5 measured by the wheel speed sensor 6 and angular acceleration data S7 measured by the gyro 8. Further, the present location calculation unit 44 uses the calculation results to perform map matching, so that the present location is incorporated onto the road (link) whose shape has the highest correlation. Further, the present location calculation unit 44 periodically uses output of the GPS receiver 9 to correct the present location.

The route search unit 42 employs, for example, Dijkstra's algorithm for searching for a route connecting the two designated points (i.e. the present location and the destination) so that the cost (such as the distance or the travel time) of the route is minimized.

The route guidance unit 43 performs route guidance using the route retrieved by the route search unit 42. For example, the route guidance unit 43 compares the information concerning the route, with the information concerning the present location and gives the user voice advice to go straight, to turn right, or to turn left before passing an intersection, through the voice input/output unit 4. Further, the route guidance unit 43 displays the traveling direction on the map displayed on the display 2 so that the recommended route is known to the user.

The display processing unit 46 receives map data corresponding to an area whose display on the display 2 is requested, from the storage unit 3. Then, the display processing unit 46 generates map rendering commands in order to render roads, other map elements, marks such as those indicating the present location, the destination, and arrows showing the recommended route, on a designated scale and by a designated rendering method. The generated commands are sent to the display 2.

The received information processing unit 48 makes the information storage unit 45 store received traffic jam information and traffic restriction information. In the case where the storage unit 3 comprises a rewritable HDD or a flash ROM, the received information processing unit 48 may make the storage unit 3 store the received information.

Figure 5:
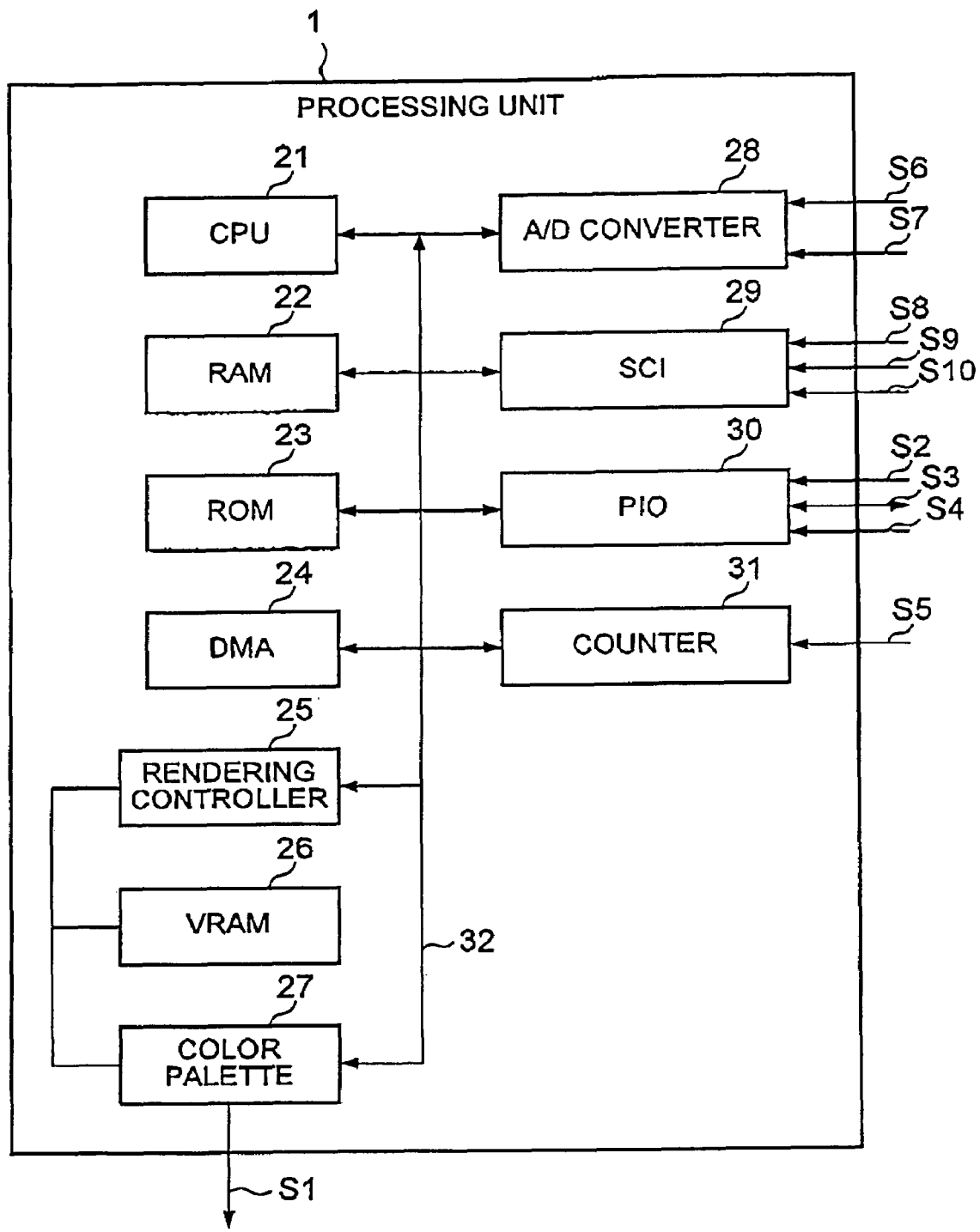
FIG. 5 is a diagram showing a hardware configuration of the processing unit 1.

FIG. 5 is a diagram showing a hardware configuration example of the processing unit 1.

As shown in the figure, the processing unit 1 is configured by connecting various devices by a bus 33. The processing unit 1 comprises: a Central Processing Unit (CPU) 21 for executing various processes such as numerical operations and control of various devices; a Random Access Memory (RAM) 22 for storing map data read from the storage unit 3, operation data, and the like; a Read Only Memory (ROM) 23 for storing programs and data: a Direct Memory Access (DMA) 24 for executing memory transfer between memories and between a memory and a device; a rendering controller 25 for executing graphics rendering and display control; a Video Random Access Memory (VRAM) 26 for buffering graphics image data; a color palette 27 for converting image data into an RGB signal; an A/D converter 28 for converting an analog signal into a digital signal; a Serial Communication Interface (SCI) 29 for converting a serial signal into a parallel signal synchronized with the bus; a Parallel Input/Output (PIO) 30 for synchronizing a parallel signal with a bus and placing the signal on the bus; and a counter 31 for integrating a pulse signal.

[Description of Operation]

Next, operation of the car-mounted navigation device 100 of the above-described configuration will be described.

Figure 6:
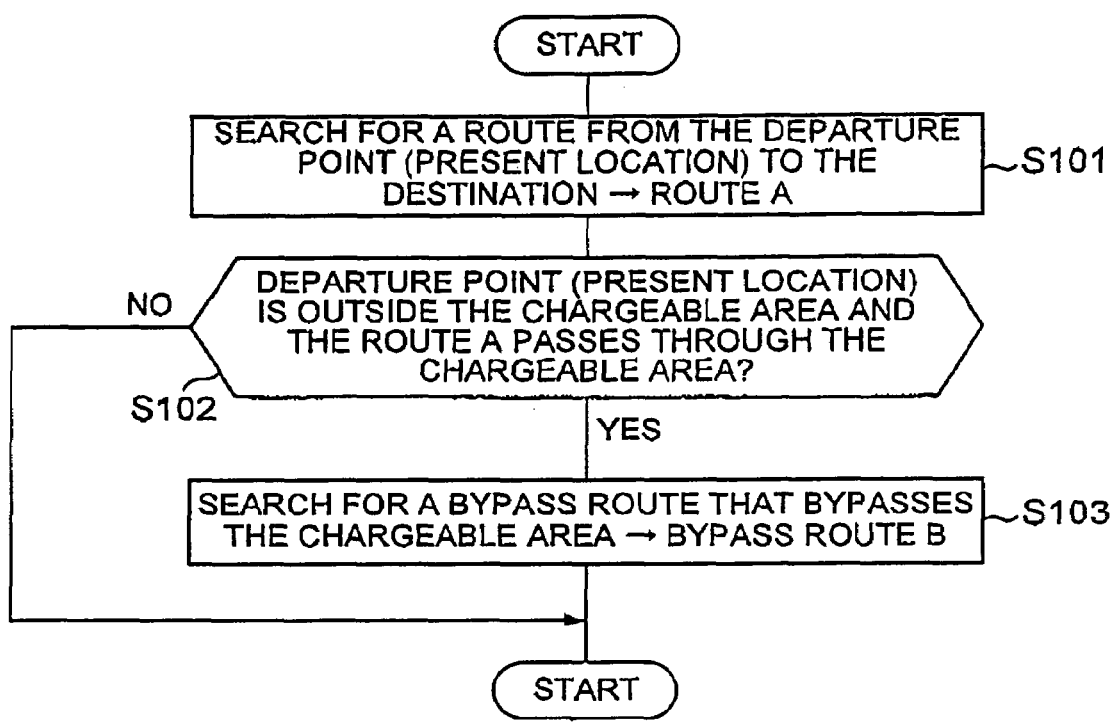
FIG. 6 is a flowchart showing route search processing.

FIG. 6 is a flowchart showing route search processing flow.

When the route search unit 42 receives a route search request from a user through the input unit 5, the route search unit 42 sets a departure point (the present location) and a destination, to search for a recommended route between them. At that time, the route search unit 42 searches for a recommended route according to specified search conditions (such as distance priority, travel time priority, or the like) regardless of whether a route passes through a chargeable area or not. In other words, here the route search unit 42 searches among candidate routes inclusive of routes whose component link is located within a chargeable area. For example, in the case where the search condition is "travel time priority", the route search unit 42 takes a link travel time 325 of the link data 320 as a link cost and searches for a route whose total cost is smallest according to, for example, Dijkstra's algorithm. The retrieved route is referred to as "route A". Here, in the case where travel times 325 in the link data have been classified by conditions such as date and weather, then, for link cost of each link, the route search unit 42 uses travel time corresponding to an expected time (date) of arrival and weather at that link. Further, in the case where traffic jam information is received from an FM multiplex broadcast station or a beacon, then the route search unit 42 performs the route search while excluding component links of the congested road or weighting those links so that it is harder to pass through the congested links (S101).

Next, referring to the chargeable area specifying information 332 of the chargeable area data 330, the route search unit 42 judges whether the departure point (present location) is outside the chargeable areas and the route A passes through some chargeable area. Whether the route A passes through some chargeable area can be judged by examining whether some component link of the route A exists within a chargeable area (S102).

In the case where the departure point (present location) is outside the chargeable areas and the route A passes through some chargeable area (Yes in S102), then the route search unit 42 searches for a bypass route (hereinafter, referred to as "bypass route B") that bypasses the chargeable area in question (S103) and ends the route search processing. In the other cases (No in S102), the route search unit 42 does not search for a bypass route and ends the route search processing.

Figure 7:
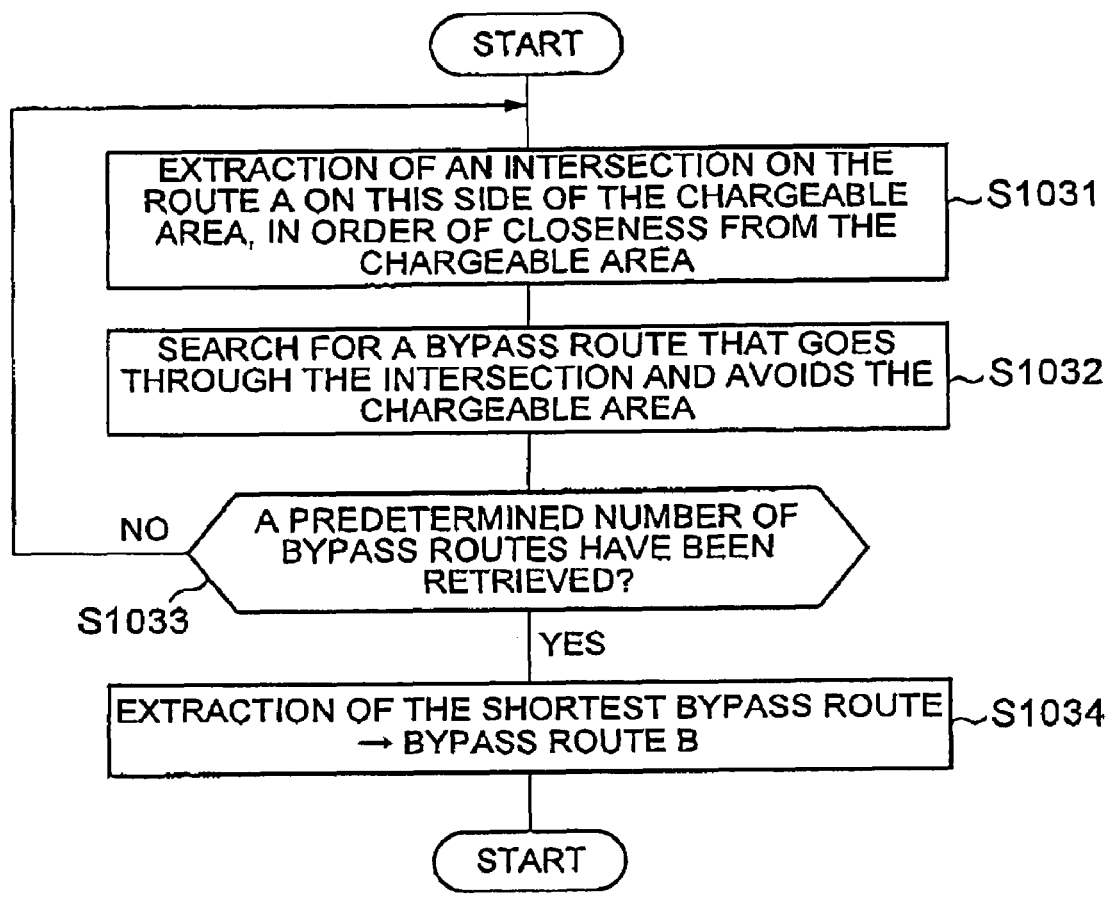
FIG. 7 is a flowchart showing bypass route search processing (S103 in FIG. 6)

Now, the bypass route search processing (S103) will be described. FIG. 7 is a flowchart showing a flow of searching for a bypass route B (S103).

First, the route search unit 42 extracts branch points (intersections) on the route A on this side of the chargeable area, one by one in order of closeness to the chargeable area (S1031). Here, branch points to be extracted may be restricted to "main intersections".

A description will be given, referring to FIG. 8. As shown in the figure, it is assumed that the route A 503 from the departure point (present location) 501 to the destination 502 passes through a chargeable area 504. Further, it is assumed that intersections 505*a* to 505*c* exist on the route A in this order from the chargeable area 504 on this side of the chargeable area 504. In this case, the route search unit 42 first extracts the intersection 505*a* in S104.

Next, the route search unit 42 searches for a route that starts from the extracted intersection and arrives at the destination bypassing the chargeable area without entering the chargeable area. In other words, the route search unit 42 makes a route search, excluding the links existing within the chargeable area, from candidates of component links of a route (S1032).

The route search unit 42 repeats the processes of S1031 and S1032 to extract a predetermined number of (for example, three) intersections one by one and to retrieve bypass routes having the extracted intersections as departure points respectively. Here, link length or travel time of a link is used as a cost of a link according to the search conditions, as described above. Further, in the case where traffic jam information has been obtained, the route search unit 42 performs the route search while excluding component links of the congested road or weighting those links so that it is harder to pass through the congested links (S1033).

Figure 8:
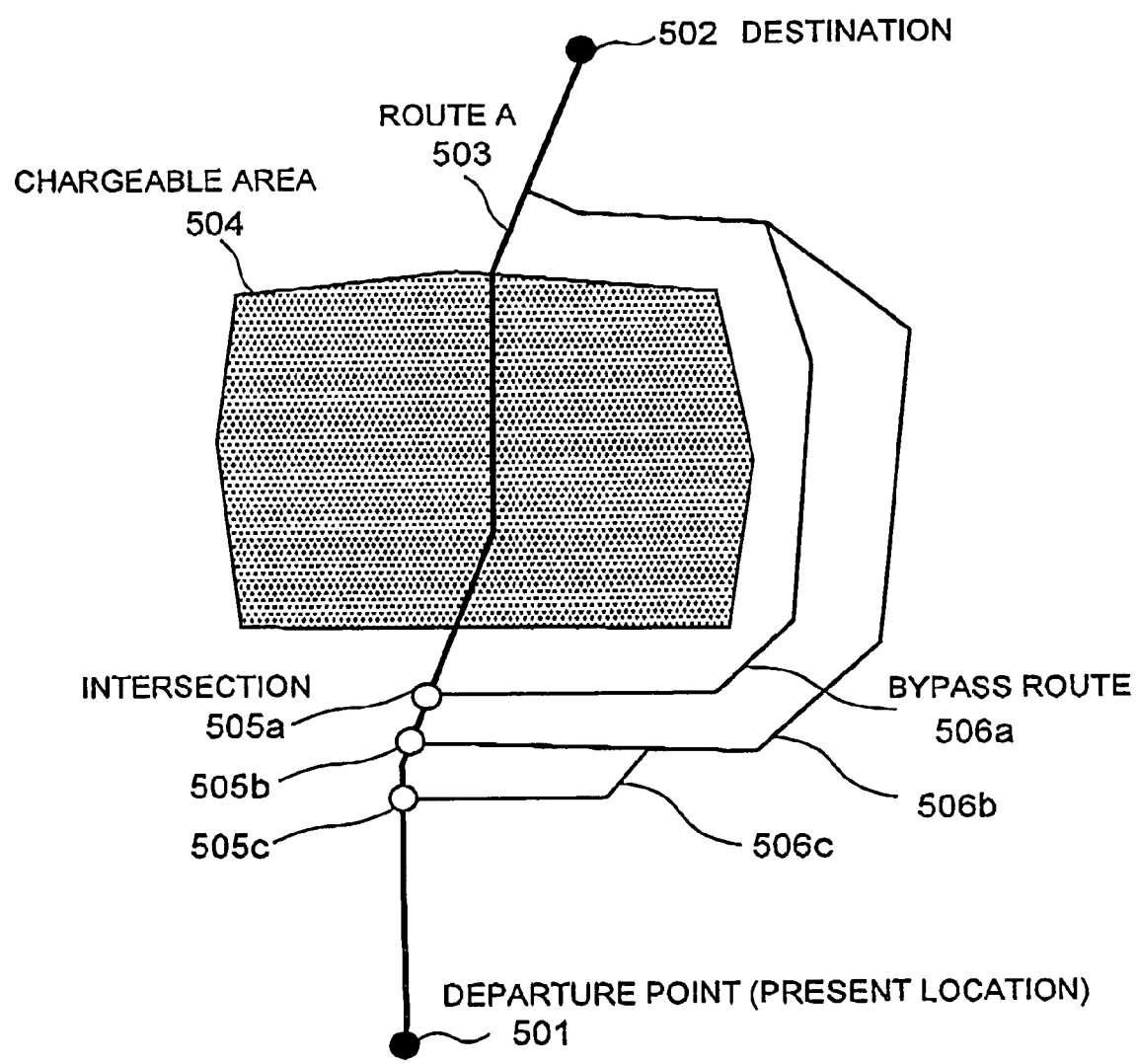
FIG. 8 is a diagram explaining the bypass route search processing.

FIG. 8 shows a state where bypass routes 506*a*, 506*b*, and 506*c*, passing through the respective intersections 505*a*, 505*b* and 505*c*, have been retrieved.

Returning to FIG. 7, the description will be continued. When the predetermined number of bypass routes has been retrieved, the route search unit 42 extracts a route having the smallest cost (distance or travel time) among the retrieved bypass routes. Then, the retrieved route is determined as the bypass route B (S1034). Thus, the route search processing for the bypass route B is ended.

The route search processing shown in FIG. 6 has been described above. The route search unit 42 performs this route search processing just after the destination is specified. Also, the route search unit 42 performs this route search processing periodically (for example, at intervals of 10 minutes) or at intervals of a predetermined travel distance (for example, at intervals of 500 m travel) (auto-rerouting). This auto-rerouting is performed for searching for the best route at that point even when the vehicle deviates from the route or the traffic conditions have changed.

Figure 9:
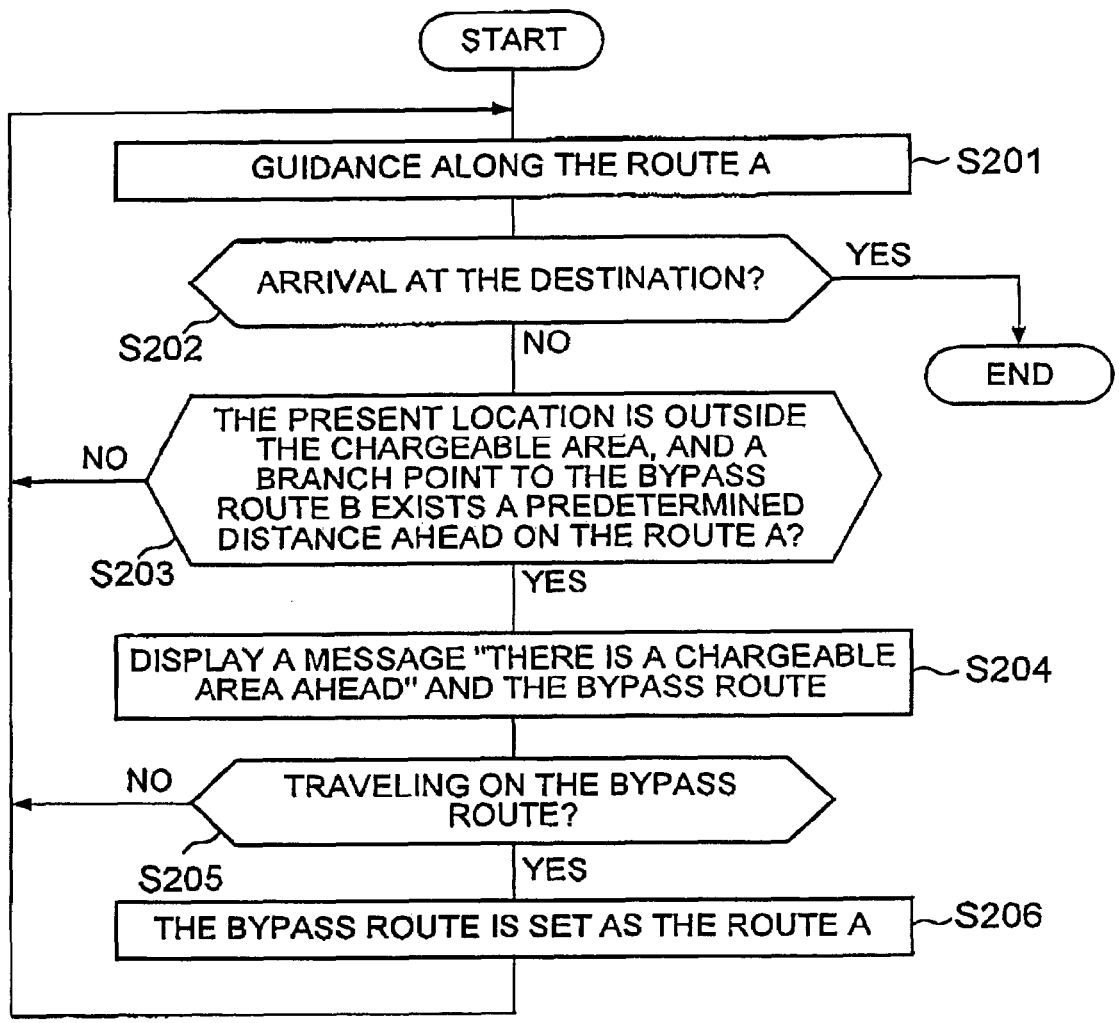
FIG. 9 is a flowchart showing route guidance processing.

Next, route guidance processing will be described. FIG. 9 is a flowchart showing flow of route guidance processing.

Usually, the route guidance unit 43 guides the user along the route A retrieved by the route search unit 42. That is to say, the route guidance unit 43 generates guide information and displays the guide information on the display 2 through the display processing unit 46 at a main intersection or the like, so that the vehicle can run along the route A (S201).

Further, the route guidance unit 43 judges whether the vehicle has arrived the destination based on the present location outputted by the present location calculation unit 44 (S202). When it is judged that the vehicle has arrived at the destination, the route guidance unit 43 ends the route guidance.

In the case where the vehicle has not arrived at the destination yet (No in S202), the route guidance unit 43 judges whether the present location is outside a chargeable area and whether a branch point to the bypass route B exists a predetermined distance (for example, 500 m) ahead from the present location on the route A (S203).

In cases where the present location is within the chargeable area, or where the present location is outside the chargeable area but a branch point to the bypass route B does not exist the predetermined distance ahead on the route A (No in S203), the route guidance unit 43 returns to S201 to continue the route guidance along the route A.

On the other hand, in cases where the present location is not within a chargeable area and a branch point to the bypass route B exists the predetermined distance ahead on the route A (Yes in S203), then the route guidance unit 43 displays or outputs by voice a message such as "There is a chargeable area ahead" to indicate existence of a chargeable area. Further, it is possible to refer to the charge content 333 in the chargeable area data 330 to display or output by voice the charge content such as "Charge is ** yen" (S204). Further, it is possible to display or output by voice the bypass route B (S204).

It is possible that the route guidance unit 43 receives an instruction to or not to guide the user along the bypass route B. For example, it is possible that, after displaying or outputting by voice a message such as "Will you use a bypass route?", the route guidance unit 43 displays the bypass route B when the user selects "Yes (use of the bypass route)" through the input unit 5.

FIG. 10 is a view showing an example of a display screen in such a case. As shown in the figure, a chargeable area 514 exists on the route A 513, and the present location 511 is near to the intersection 515 for the bypass route B 516. In such a case, a message 517 such as "There is a chargeable area ahead. Will you use a bypass route?" is displayed.

Returning to FIG. 9, the description will be continued. After step S204, the route guidance unit 43 monitors the present location (S205). In the case where the vehicle passes through the branch point leading to the bypass route B and yet the present location is not found on the bypass route B (i.e. the vehicle does not travel on the bypass route but continues to travel on the route A toward the chargeable area) (No in S205), then the route guidance unit 43 returns to S202 to continue the processing. In other words, the route guidance unit 43 continues to guide the user along the route A. Also in cases where the user selects "non-use of the bypass route" through the input unit 5, the route guidance unit 43 returns to S202 to continue the route guidance according to the route A.

On the other hand, in the case where the present location is found on the bypass route B (i.e. the vehicle travels on the bypass route) or where the user selects "use of the bypass route" through the input unit 5 (Yes in S205), then the route guidance unit 43 sets the bypass route B as the route A (S206) and returns to S202 to continue the processing. In other words, the route guidance unit 43 performs the route guidance according to the newly-set route A.

FIG. 11 is a view showing an example of screen display when the user travels on the bypass route B. The screen displays the new route A 523 that bypasses the chargeable area 514.

The route guidance unit 43 performs the above-described processes S201 to S206 until the vehicle arrives at the destination. In the meantime, as described above, the route search unit 42 periodically searches for the route A to the destination anew. Further, in the case where the route A passes through any chargeable area, then also the search for the bypass route B is performed (auto-rerouting). By such auto-rerouting, it is possible to cope with a case where the congestion state changes or a case where the vehicle deviates from the proper route.

When the vehicle arrives at the destination (Yes in S202), the route guidance unit 43 ends the route guidance processing.

One embodiment of the present invention has been described above.

According to the above embodiment, when a chargeable area is near, it is possible to ask a user whether he wishes to enter into the chargeable area, before passing through the last intersection that allows the user to avoid entering into the chargeable area and allows him to arrive at the destination without taking a long way around the chargeable area. As a result, the user can choose to enter into the chargeable area just before entering into the chargeable area even if the user could not decide at the time of departure.

The present invention is not limited to the above embodiment. The above-described embodiment can be variously modified within the scope of the invention.

For example, a chargeable area has been taken as an example of an area that may be avoided. However, the present invention is not limited to this. For example, a speed restriction area or an occupancy restriction area may be taken as an area that may be avoided.

Further, there is no restriction on the timing of the auto-rerouting during route guidance. In addition, the auto-rerouting may not performed during route guidance.

The above embodiment has been described for an example where the present invention is applied to a car-mounted navigation device. However, the present invention can be applied to navigation devices other than car-mounted navigation devices.

The invention claimed is:

1. A navigation device comprising:
    a storage unit adapted to store information concerning an area to be avoided;
    a route search unit adapted to search for a recommended route to a destination, without regard to whether said recommended route passes through said area to be avoided;
    a bypass route search unit adapted to search for a bypass route that avoids entering into said area to be avoided, if said recommended route passes through said area to be avoided; and
    a guidance unit adapted to display said bypass route, when the present location moves to a predetermined distance before a branch point to said bypass route.

2. A navigation device comprising:
    a detector unit adapted to detect a present location;
    an avoidance area unit adapted to obtain information concerning an area to be avoided;

a setting unit adapted to set a departure point and a destination;

a route search unit adapted to search for a route A from said departure point to said destination;

a bypass route search unit adapted to search for a route B that starts from a branch point on said route A on a near side of said area to be avoided and bypasses said area to be avoided, if said route A passes through said area to be avoided; and a guidance unit adapted to display said route B, when the present location moves to a predetermined distance before said branch point.

3. A navigation device comprising:

a detector unit adapted to detect a present location;

an avoidance area unit adapted to obtain information concerning an area to be avoided;

a setting unit adapted to set a departure point and a destination;

a route search unit adapted to search for a route A from said departure point to said destination;

a bypass route search unit adapted to search for a route B that starts from a branch point on said route A on a near side of said area to be avoided and bypasses said area to be avoided, if said route A passes through said area to be avoided; and a guidance unit adapted to:

give guidance using said route A, until the present location moves to a predetermined distance before said branch point;

display that the area to be avoided exists, when the present location moves to a predetermined distance before said branch point;

give guidance using the route A when the present location is on the route A even after passing said branch point; and give guidance using the route B when the present location is on the route B after passing said branch point.

4. A navigation device comprising:

a detector unit adapted to detect a present location;

an avoidance area unit adapted to obtain information concerning an area to be avoided;

a setting unit adapted to set a departure point and a destination;

a route search unit adapted to search for a route A from said departure point to said destination;

a bypass route search unit adapted to search for a route B that starts from a branch point on said route A on a near side of said area to be avoided and bypasses said area to be avoided, if said route A passes through said area to be avoided; and a guidance unit adapted to:

give guidance using said route A, until the present location moves to a predetermined distance before said branch point;

receive an instruction on whether the route B should be used for guidance, when the present location moves to the predetermined distance before said branch point;

give guidance using the route B when the instruction to use the route B for guidance is received; and give guidance continuously using the route A when the instruction to use the route B for guidance is not received.

5. A navigation device according to claim 2, wherein:

said bypass route search unit is adapted to:

extract a predetermined number of branch points located before said area to be avoided on said route A;

search for bypass routes that respectively start from the extracted branch points and bypass said area to be avoided; and take, as the route B, a bypass route whose distance or travel time is shortest among the bypass routes.

6. A navigation device according to claim 1, wherein:

said area to be avoided is a chargeable area; and said guidance unit is adapted to display a charge content when the present location moves to the predetermined distance before said branch point.

7. A navigation device according to claim 3, wherein:

said bypass route search unit is adapted to:

extract a predetermined number of branch points located before said area to be avoided on said route A;

search for bypass routes that respectively start from the extracted branch points and bypass said area to be avoided; and take, as the route B, a bypass route whose distance or travel time is shortest among the bypass routes.

8. A navigation device according to claim 4, wherein:

said bypass route search unit is adapted to:

extract a predetermined number of branch points located before said area to be avoided on said route A;

search for bypass routes that respectively start from the extracted branch points and bypass said area to be avoided; and take, as the route B, a bypass route whose distance or travel time is shortest among the bypass routes.

9. A navigation device according to claim 2, wherein:

said area to be avoided is a chargeable area; and said guidance unit is adapted to display a charge content when the present location moves to the predetermined distance before said branch point.

10. A navigation device according to claim 3, wherein:

said area to be avoided is a chargeable area; and said guidance unit is adapted to display a charge content when the present location moves to the predetermined distance before said branch point.

11. A navigation device according to claim 4, wherein:

said area to be avoided is a chargeable area; and said guidance unit is adapted to display a charge content when the present location moves to the predetermined distance before said branch point.

12. A navigation device according to claim 5, wherein:

said area to be avoided is a chargeable area; and said guidance unit is adapted to display a charge content when the present location moves to the predetermined distance before said branch point.

13. A navigation device comprising:

a detector unit adapted to detect a present location;

an avoidance area unit adapted to obtain information concerning an area to be avoided;

a setting unit adapted to set a departure point and a destination;

a route search unit adapted to search for a route A from said departure point to said destination;

a bypass route search unit adapted to search for a route B that starts from a branch point on said route A on a near side of said area to be avoided and bypasses said area to be avoided, if said route A passes through said area to be avoided; and a guidance unit adapted to display that the area to be avoided exists and for displaying said route B, when the present location moves to a predetermined distance before said branch point.

14. A navigation device according to claim 13, wherein:

said bypass route search unit is adapted to:

extract a predetermined number of branch points located before said area to be avoided on said route A;

search for bypass routes that respectively start from the extracted branch points and bypass said area to be avoided; and take, as the route B, a bypass route whose distance or travel time is shortest among the bypass routes.

15. A navigation device according to claim 13, wherein:
said area to be avoided is a chargeable area; and
said guidance unit is adapted to display a charge content when the present location moves to the predetermined distance before said branch point.

* * * * *

UNITED STATES PATENT AND TRADEMARK OFFICE
CERTIFICATE OF CORRECTION

PATENT NO. : 7,634,356 B2  Page 1 of 1
APPLICATION NO. : 11/514219
DATED : December 15, 2009
INVENTOR(S) : Oguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 447 days.

Signed and Sealed this

Ninth Day of November, 2010

David J. Kappos
*Director of the United States Patent and Trademark Office*